US010850727B2

United States Patent
Mason et al.

(10) Patent No.: US 10,850,727 B2
(45) Date of Patent: Dec. 1, 2020

(54) SYSTEM, METHOD, AND APPARATUS FOR PARKING ASSISTANCE

(71) Applicant: Toyota Research Institute, Inc., Los Altos, CA (US)

(72) Inventors: Julian M. Mason, Redwood City, CA (US); Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 140 days.

(21) Appl. No.: 15/916,955

(22) Filed: Mar. 9, 2018

(65) Prior Publication Data

US 2019/0276010 A1 Sep. 12, 2019

(51) Int. Cl.
   *B60W 30/06* (2006.01)
   *G05D 1/02* (2020.01)
   *B62D 15/02* (2006.01)
   *G08G 1/14* (2006.01)

(52) U.S. Cl.
   CPC ......... *B60W 30/06* (2013.01); *B62D 15/0285* (2013.01); *G05D 1/0212* (2013.01); *G08G 1/141* (2013.01)

(58) Field of Classification Search
   CPC ........ G08G 1/141; G08G 1/142; G08G 1/143; G08G 1/145; B60W 30/06; B62D 15/267; B62D 15/0285; G05D 1/0212
   See application file for complete search history.

(56) References Cited

U.S. PATENT DOCUMENTS

| 7,868,784 | B2 * | 1/2011 | Kuo | G06Q 10/02 |
| | | | | 340/928 |
| 7,956,769 | B1 * | 6/2011 | Pearl | G08G 1/14 |
| | | | | 340/539.1 |
| 8,078,349 | B1 | 12/2011 | Gomez et al. | |
| 9,373,256 | B2 * | 6/2016 | Sandbrook | G08G 1/01 |
| 9,378,601 | B2 * | 6/2016 | Ricci | H04W 4/44 |
| 9,514,646 | B2 | 12/2016 | Stefan et al. | |
| 9,616,927 | B2 | 4/2017 | Tsukamoto | |
| 10,311,731 | B1 * | 6/2019 | Li | G08G 1/142 |
| 2009/0189865 | A1 * | 7/2009 | Mishra | G06F 3/018 |
| | | | | 345/173 |

(Continued)

FOREIGN PATENT DOCUMENTS

| JP | 2005-193742 | | 7/2005 |
| JP | 2008-296791 | | 12/2008 |
| JP | 2009051473 A | * | 3/2009 |

OTHER PUBLICATIONS

Machine Translation of JP-2009051473-A (Year: 2009).*

*Primary Examiner* — Anne Marie Antonucci
*Assistant Examiner* — Sahar Motazedi
(74) *Attorney, Agent, or Firm* — Oblon, McClelland, Maier & Neustadt, L.L.P.

(57) ABSTRACT

A method, an apparatus, and a non-transitory computer readable medium for parking assistance are provided. The method includes identifying a parking space based on information acquired from a plurality of sensors, connecting to a sensor associated with the identified parking space, acquiring measurement data from the sensor indicative of a vehicle position relative to the sensor, determining a parking trajectory based on the measurement data, and controlling at least a subsystem of a vehicle based on the parking trajectory.

15 Claims, 5 Drawing Sheets

(56) References Cited

U.S. PATENT DOCUMENTS

| | | | |
|---|---|---|---|
| 2014/0210646 A1* | 7/2014 | Subramanya | B61L 29/28 340/928 |
| 2014/0350853 A1* | 11/2014 | Proux | G01C 21/34 701/533 |
| 2016/0125736 A1* | 5/2016 | Shaik | G08G 1/14 701/23 |
| 2016/0207526 A1* | 7/2016 | Franz | B62D 15/028 |
| 2016/0337453 A1* | 11/2016 | Lee | G06F 8/38 |
| 2016/0368489 A1* | 12/2016 | Aich | B60W 30/06 |
| 2017/0046955 A1* | 2/2017 | Shen | G08G 1/143 |
| 2017/0046956 A1* | 2/2017 | Gaebler | G01C 21/3492 |
| 2017/0285654 A1* | 10/2017 | Nagai | B60W 30/06 |
| 2017/0351267 A1* | 12/2017 | Mielenz | B60W 30/06 |
| 2017/0355307 A1* | 12/2017 | Ha | G08G 1/143 |
| 2018/0043884 A1* | 2/2018 | Johnson | B60W 30/06 |
| 2018/0093664 A1* | 4/2018 | Kim | B62D 15/027 |
| 2018/0162384 A1* | 6/2018 | Kim | B60W 30/06 |
| 2018/0194344 A1* | 7/2018 | Wang | G05D 1/0221 |
| 2018/0244287 A1* | 8/2018 | Kirstein | B62D 15/027 |
| 2019/0164428 A1* | 5/2019 | Pu | G01C 21/00 |
| 2019/0251841 A1* | 8/2019 | Munireddy | G08G 1/142 |

* cited by examiner

SYSTEM, METHOD, AND APPARATUS FOR PARKING ASSISTANCE

BACKGROUND

Parking can be a difficult aspect of owning a vehicle. U.S. Pat. No. 9,616,927 B2 entitled "PARKING ASSISTANCE SYSTEM" by Tsukamoto describes a parking assistance system.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for parking assistance. The method identifies a parking space based on information acquired from a plurality of sensors, connects to a sensor associated with the identified parking space, acquires measurement data from the sensor indicative of a vehicle position relative to the sensor, determines a parking trajectory based on the measurement data, and controls at least a subsystem of a vehicle based on the parking trajectory.

The present disclosure also relates to an apparatus for parking assistance. The apparatus includes at least one sensor and a controller. The controller is configured to identify a parking space based on information acquired from the at least one sensor, connect to a sensor associated with the identified parking space, acquire measurement data from the sensor indicative of a vehicle position relative to the sensor, determine a parking trajectory based on the measurement data, and control at least a subsystem of a vehicle based on the parking trajectory.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system, an apparatus, and associated methodology for parking assistance.

Figure 1:
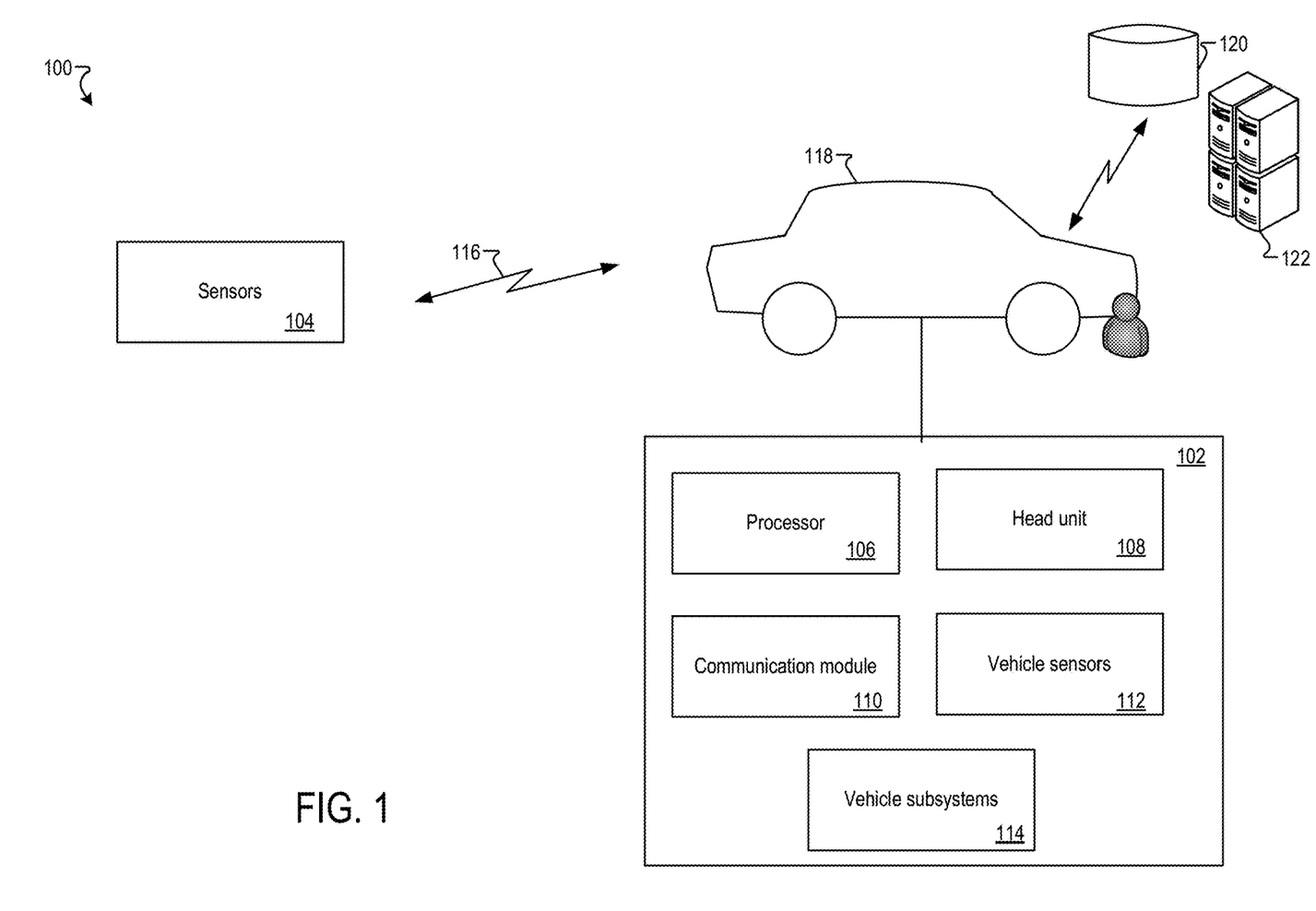
FIG. 1 is a schematic of a system environment for parking assistance according to one example.

FIG. 1 is a schematic of a system environment 100 according to one example. The system environment 100 may include sensors 104 (e.g., proximity sensors, cameras, radar, laser sensors, infrared sensors, ultrasonic sensors, or the like), a database 120, a server 122, and a vehicle 118. The sensors 104 may be one or more sensors configured to transmit data to a vehicle system 102. The data may be related to a distance between the sensors 104 and the vehicle 118. The sensors 104 may be fixed to at least one wall and/or ceiling of a parking structure. In one implementation, the sensors 104 are mobile sensors that may be deployed by a vehicle user in a desired parking location. The vehicle system 102 may include a processor 106, a head unit 108, a communication module 110, vehicle sensors 112, and vehicle subsystems 114. The sensors 104 and the processor 106 may communicate via a wireless communication link 116. The wireless communication link 116 may include, but is not limited to, WiFi, Bluetooth technology, and/or a combination thereof.

The processor 106 may be a central processing unit (CPU) which performs the processes described herein. The processor 106 may also include a memory to store process data and instructions. Further, the processor 106 may be implemented as multiple processors cooperatively working in parallel to perform the instructions of the inventive processes described above. The processor 106 may determine a boundary of a parking space based on the data received from the sensors 104 and determine parking instructions and commands based on the boundary of the parking space and the current position of the vehicle 118. Further, the processor 106 may retrieve information associated with the parking space from the database 120 (e.g., an image) as described further below.

The head unit 108 may receive input from the vehicle user via a user interface. The user interface may include buttons, a touch screen, a microphone, a speaker, or the like. The head unit 108 may display the identified boundary of the parking space. Further, when two or more available parking spaces are detected, the head unit 108 may acquire a selection from the vehicle user as described further below.

The communication module 110 may be a transceiver configured to establish a communication with the one or more sensors 104 or database 120 via the communication link 116 or a network. The network can be a public network, such as the Internet, or a private network such as LAN or WAN network, or any combination thereof and can also include PSTN or ISDN sub-networks. The network can also be a cellular network including EDGE, 3G and 4G wireless cellular systems. The wireless network can also be WiFi®, Bluetooth®, or any other wireless form of communication that is known.

The vehicle sensors 112 may include ultrasonic sensors, rear view cameras, front view cameras, distance sensors, accelerometers, positon sensors, and the like. The vehicle sensors 112 may be activated by the processor 106.

The vehicle subsystems 114 may include a steering subsystem, a parking assist subsystem or an autonomous parking subsystem. The components of the vehicle system 102 may be connected through a vehicle network (e.g., a CAN bus) as described in FIG. 5.

The vehicle 118 may be any type of vehicle such as a car, truck, bus, airplane, helicopter, motorcycle, or ship. The vehicle 118 may be gas-powered, diesel powered, electric, or solar-powered. The vehicle 118 may be actively operated by a driver or may be partially or completely autonomous or self-driving.

The database 120 may be a cloud database or associated with the server 122. The database 120 may store information and data associated with the sensors 104. For example, the database 120 may store the operational status of each sensor and information associated with the parking space associated with the sensor 104 (e.g., image, parking availability, restricted hours, reverse parking only, parallel parking only, and the like).

The system and methodologies described herein may be implemented in a parking garage. The parking garage may include one or more parking spaces. The parking spaces may be equipped with sensors 104. Each parking space may be identified by the vehicle system 102. A group of sensors may be associated with a single parking space.

The sensors 104 may be activated once a vehicle is within a predetermined distance (e.g., 1 meter). One of the sensors may continuously or at predetermined instances (e.g., 30 seconds, 1 minute, or the like) transmit a signal. Once the sensor receives an acknowledgment from the vehicle system 102. The sensor 104 may send a control signal to the remaining sensors that causes the remaining sensors to be activated and start transmitting data to the vehicle 118.

In one implementation, the vehicle system 102 may establish communication with one or more sensors 104 when the vehicle 118 is less than a predefined vicinity from the one or more sensors 104.

In one implementation, the vehicle user may input via the head unit 108 a request to park the vehicle. The vehicle user may also activate parking assistance via a smartphone application using an electronic device associated with the vehicle user. The processor 106 may then send a ping signal to detect or activate nearby sensors 104. The sensors 104 associated with an available parking space may respond by sending an acknowledgment signal. The processor 106 may identify the nearby sensors 104 based on a signal strength of the acknowledgment signal. The processor 106 may compare the signal strength with a predetermined signal strength to determine whether the sensor is associated with the parking space. For example, in response to determining that the signal strength is greater than the predetermined signal strength, the processor 106 may determine that the sensor is associated with the parking space. The processor 106 may also determine the signal strength of all the signals detected and then associate the sensors with the highest signal strength with the parking space. For example, the four sensors with the highest signal strength may be associated with the parking space. Data received from the four sensors may be used to generate the control commands or parking instructions to park the vehicle in the parking space.

The vehicle 118 may not be equipped with an autonomous or semi-autonomous parking system. The vehicle system 102 may provide instructions to the vehicle user based on the sensed data via the electronic device associated with the vehicle user. For example, the processor 106 may output steering directions based on the boundary of the identified parking space and the current position of the vehicle. Further, the sensors 104 may transmit images or real-time video of the parking space when the vehicle 118 is not equipped with rear and front cameras.

Data from the sensors 104 are used to determine a parking trajectory when the vehicle 118 is equipped with an autonomous parking system. The autonomous parking system may control one or more subsystems 114 of the vehicle 118 based on the parking trajectory. For example, the autonomous system may control a steering wheel, a brake system, and the like based on the determined parking trajectory.

The parking assistance system may be activated by, for example, the vehicle user. In other implementation, the parking assistance system may be activated once a group of sensors is detected.

The modules described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

Figure 2A:
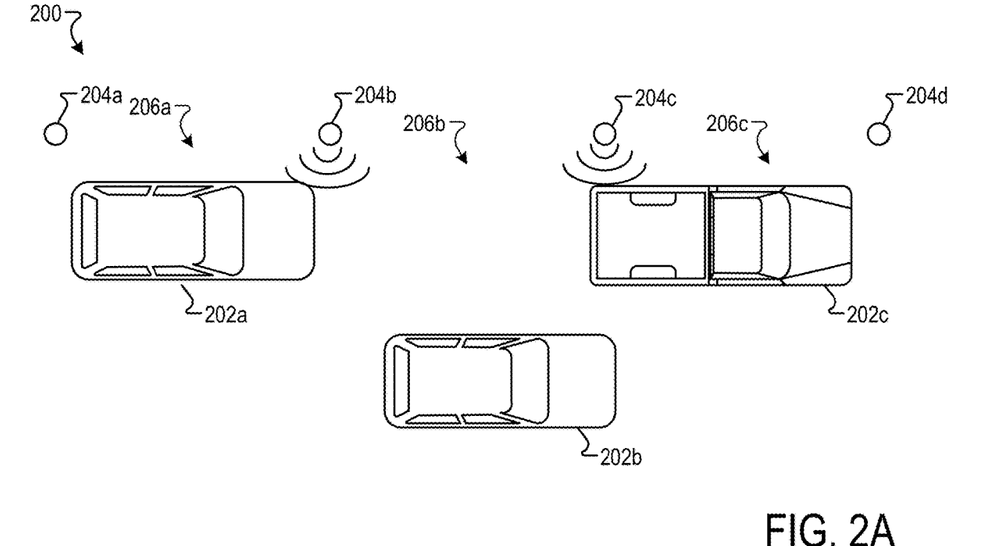
FIG. 2A is a schematic that shows an illustration of a parking space according to one example.

FIG. 2A is a schematic 200 that shows an illustration of a parking space according to one example. The sensors 104 may be used to assist with parallel parking. Sensors 204a, 204b, 204c, 204d may be positioned along a route. Schematic 200 shows two parked vehicles 202a and 202c. Sensors 204b and 204c may be activated once the vehicle 202b is detected (e.g., within a range such as 3 meters). In one implementation, the sensors 204 may remain active when no vehicle is detected in the parking space. For example, sensors 204b and 204c may continuously transmit data to vehicles.

In one example, a sensor 204 may be associated with two or more adjacent parking spaces. Each of the sensors may have unique identification information. Further, each of the sensors may be associated with a group of sensors corresponding to a parking space. The unique identification information may include an identification of the group. The processor 106 may retrieve from the database 120 information associated with the parking space identified by the sensors unique identification information. In schematic 200, sensor 204b may be associated with parking space 206a and parking space 206b. Sensor 204c may be associated with parking space 206b and parking space 206c.

Figure 2B:
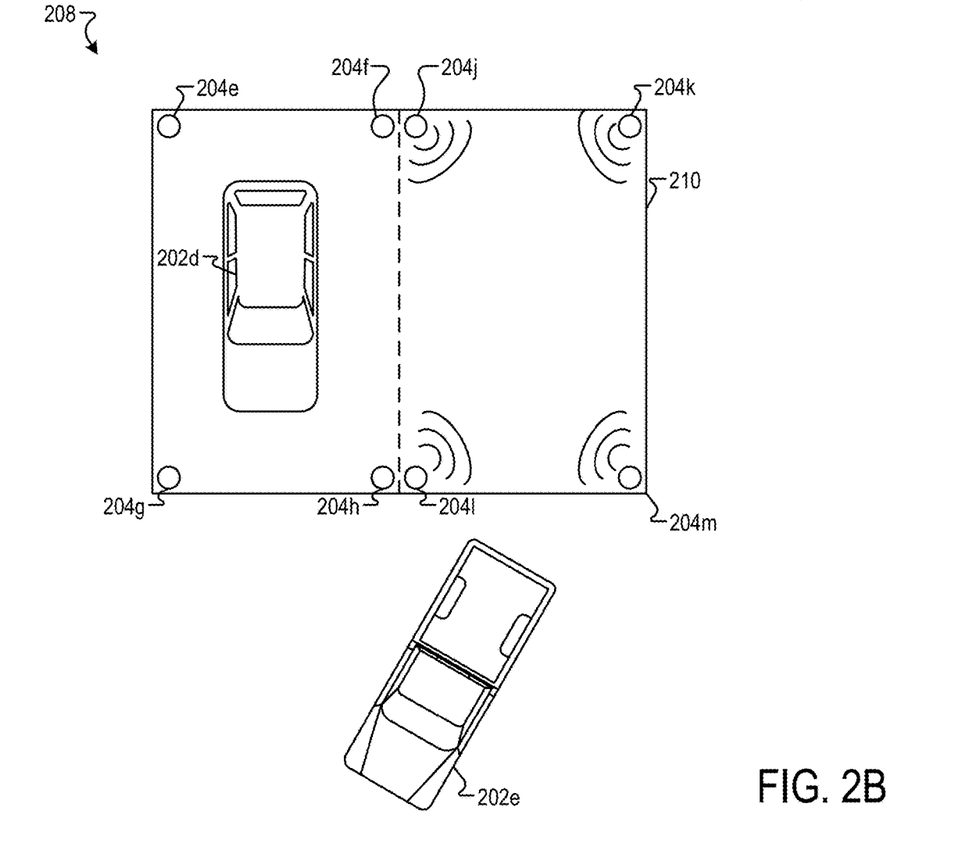
FIG. 2B is a schematic that shows an illustration of an available parking space according to another example.

FIG. 2B is a schematic 208 that shows an illustration of an available parking space in a parking garage 210 according to one example. In one implementation, the parking garage may be a home garage that may include two parking spaces. A first group of sensors, 204e, 204f, 204g, 204h may be associated with a first parking space and a second group of sensors (204j, 204k, 204l, 204m) may be associated with a second parking space. Each group of sensors may have unique identification information. The processor 106 may retrieve information associated with the parking space using the unique identification information. The one or more sensors 204 (i.e., 204e, 204f, 204g, 204h, 204j, 204k, 204l, 204m) may be fixed to at least one wall and/or ceiling of the parking garage 210.

Figure 3:
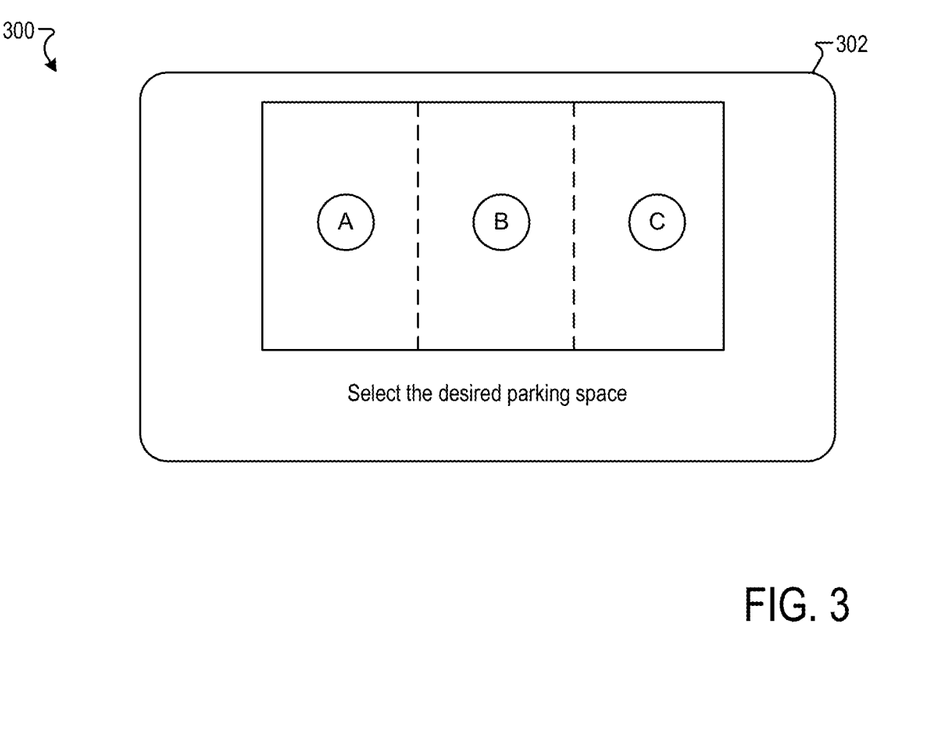
FIG. 3 is a schematic that shows a display of a head unit according to one example.

FIG. 3 is a schematic 300 that shows a display 302 of the head unit 108 according to one example. The vehicle system 102 may generate a representation of the available parking spaces when two or more parking spaces are available. Schematic 300 shows three available parking spaces on the display 302. The head unit 108 may receive the selection of the vehicle user via voice recognition or via the touch screen. The vehicle system 102 may also capture via a camera an image of the available parking spaces. The vehicle system 102 may superimpose boundaries of each available space on the captured image. In one implementation, the image of the available space may be retrieved from the database 120. The representation of the available parking spaces may also include an indication of the size of the available parking spaces. For example, the vehicle system 102 may highlight the largest parking space when the vehicle does not include an autonomous parking subsystem.

Figure 4:
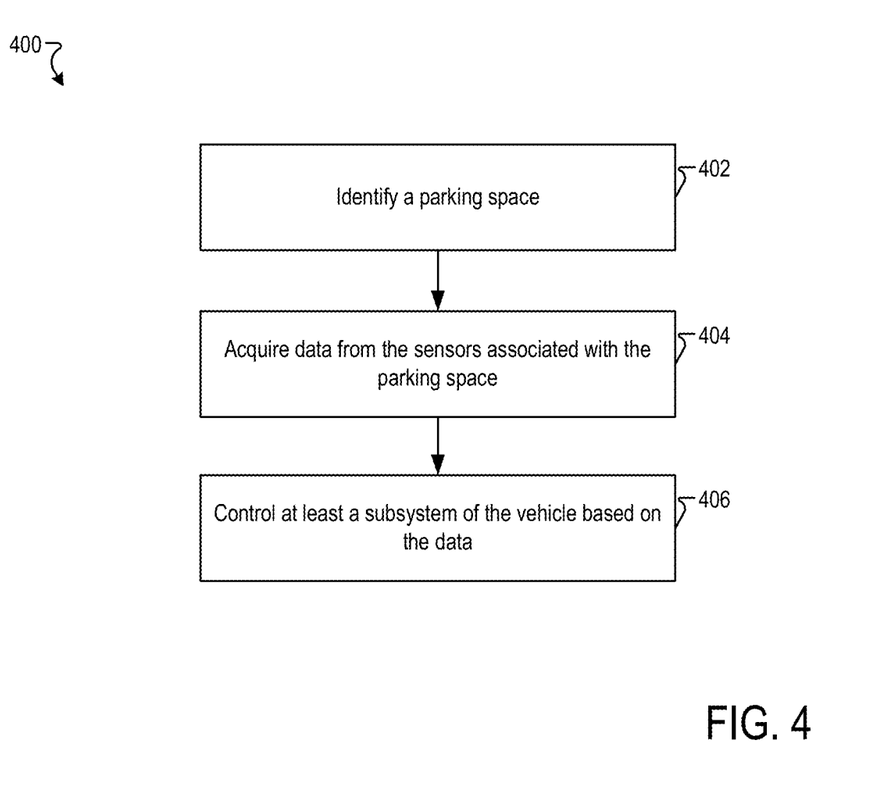
FIG. 4 is a flowchart for a parking assistance process according to one example.

FIG. 4 is a flowchart for a method 400 for parking assistance according to one example. At step 402, the vehicle 118 may connect with the sensors 102. The vehicle 118 may start receiving data from the sensors. The data may include distances that are associated with the boundary of the parking space. For example, when four sensors are positioned on the four corners of the parking space distance, the sensors 104 may transmit distance measurements between each other to define the boundary of the parking space. The data may also include measurements from the sensor 104 to the vehicle 118. The measurement may be associated with a predefined target point on the vehicle. The measurement may include a distance and/or an angle to the predefined target point of the vehicle.

At step 404, the vehicle system 102 may determine the boundary of the parking space based on the data acquired from the sensors. The vehicle system 102 may retrieve from the database 120 one or more images associated with the detected parking space. In one implementation, the vehicle system 102 may activate one or more cameras to capture one or more images of the identified parking space.

The vehicle system 102 may provide the user via the head unit 108 with the image superimposed with the parking boundary. In one example, the system 102 may superimpose two or more parking boundaries with the captured and/or retrieved image. The vehicle user may then select one of the parking spaces. In response to receiving the selection from the vehicle user, the system 102 may deactivate the sensors associated with the non-selected parking space. The vehicle system 102 may also receive a desired parking type (e.g., back-in). In one implementation, the system 102 may filter the data received based on the selected parking space. For example, the system 102 may filter data based on the unique identification information transmitted with the data from each sensor 104. Data from sensors 104 associated with the parking space are used. The data may also be filtered based on the unique identification information of the group of sensors associated with the parking space.

In one implementation, the data may include information about the parking space. The information may include cost to park, time limits, zone restrictions, and the like. The information may be presented to the vehicle user via the head unit 108 (e.g., via the display or the speaker). In addition, the sensors 104 may be activated/deactivated based on the information. For example, the sensors 104 may be deactivated when parking in the parking space associated with the sensors 104 is not permitted. The information may be stored in the sensors 104. Additionally or alternatively, the information may be stored in the memory of the vehicle system 102. The processor 106 may analyze the information to determine whether the parking space is available. For example, the processor 106 may retrieve using the unique identification information of the sensor the information associated with the sensor using a look-up table stored in the memory.

At step 406, the vehicle system 102 may activate an autonomous parking mode. The system 102 may transmit data to the autonomous parking system from the sensors associated with the selected parking space. The vehicle system 102 may generate control commands and output the control commands to the vehicle subsystems 114.

The method 400 may be implemented through a computer algorithm, machine executable code, or software instructions programmed into a suitable programmable logic device(s) of the vehicle, such as the vehicle control module, the device control module, or another controller in communication with the vehicle computing system, or a combination thereof. Although the various operations shown in the flowchart appear to occur in a chronological sequence, at least some of the operations may occur in a different order, and some operations may be performed concurrently or not at all.

Figure 5:
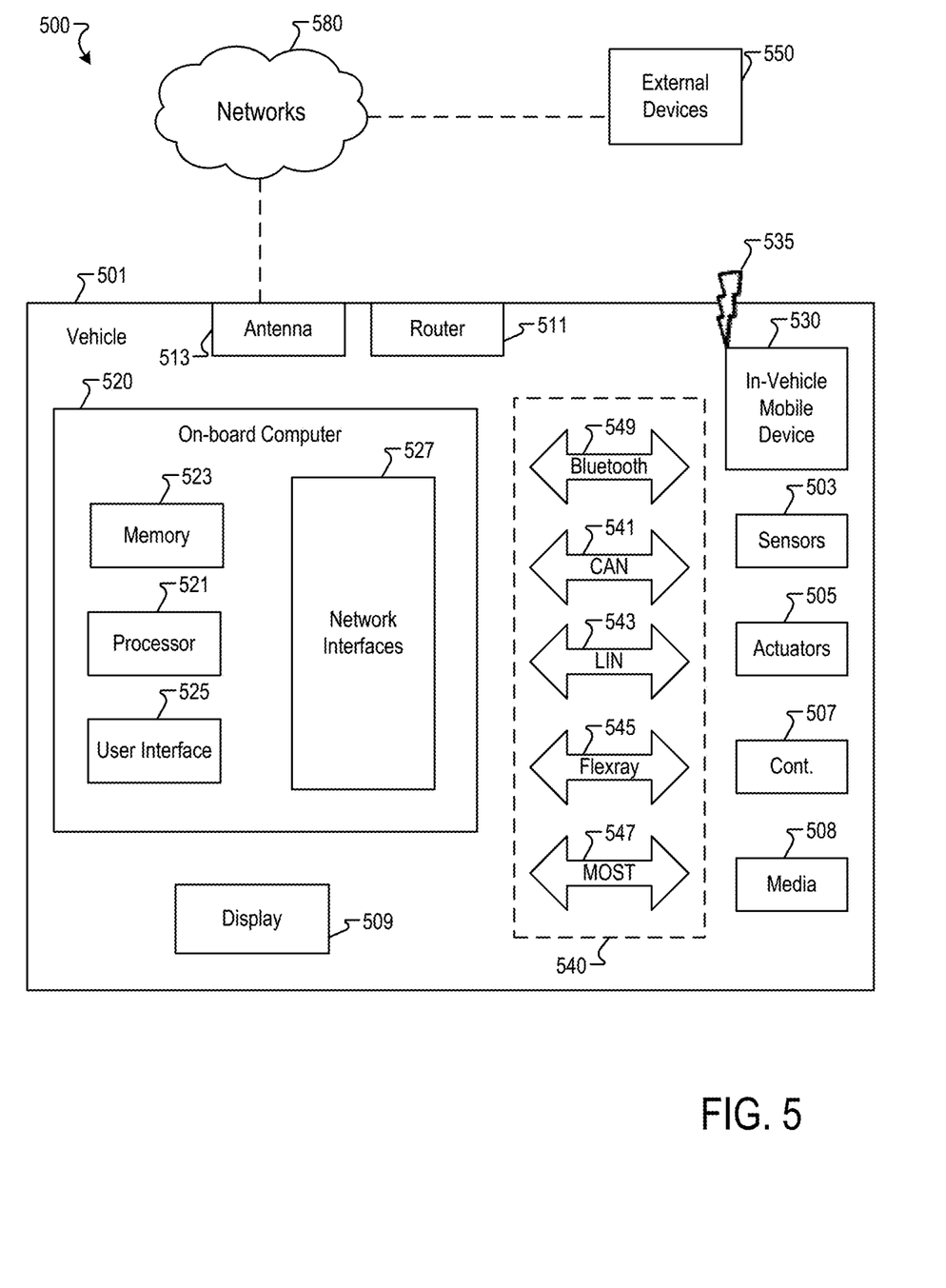
FIG. 5 is a simplified block diagram of a vehicle environment according to one example.

FIG. 5 is a simplified block diagram of a vehicle environment 500 in which embodiments of the invention disclosed herein may be implemented. The vehicle environment 500 includes a vehicle 501 in communication with one or more external devices 550 (e.g., database 120) by way of one or more external networks 580. Vehicle 501 also includes various internal networks 540 for interconnecting several vehicle devices within the vehicle as will be discussed below. The vehicle environment 500 may also include one or more in-vehicle mobile device 530. External devices 550 include any device located outside the vehicle 501 such that the external device must communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. The one or more on board computers may generate signals to control one or more vehicle subsystems 114. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself. Actuators 505 cause motion of some mechanical element of the vehicle in response to a control signal. For example, actuators 505 may be hydraulic actuators, pneumatic actuators or electrical/electronic actuators such as a stepper motor.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525 (e.g., the operator interface described previously herein), and one or more network interface 527.

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. Vehicle networks 540 typically include hard wired bus type networks, each providing communication pathways to particular vehicle devices distributed throughout a vehicle. FIG. 5 shows four examples of such hard wired networks: Controller Area Network (CAN) 541, Local Internet Network (LIN) 543, Flexray bus 545, and Media Oriented System Transport (MOST) network 547.

Other hard wired internal networks such as Ethernet may be used to interconnect vehicle devices in the vehicle 501. Further, internal wireless networks 549, such as near field communications, Bluetooth, etc. may interconnect vehicle devices.

Users (driver or passenger) may initiate communication in vehicle environment 500 via some network, and such communication may be initiated through any suitable device such as, in-vehicle mobile device 530, display 509, user interface 525, or external devices 550, such as sensors 104.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor 106 communicates, such as a server or computer.

Further, the claimed advancements may be provided as a utility application, background daemon, or component of an operating system, or combination thereof, executing in conjunction with the processor 106 and an operating system such as Microsoft® Windows®, UNIX®, Oracle® Solaris, LINUX®, Apple macOS® and other systems known to those skilled in the art.

Obviously, numerous modifications and variations are possible in light of the above teachings. It is therefore to be understood that within the scope of the appended claims, the invention may be practiced otherwise than as specifically described herein.

A system which includes the features in the foregoing description provides numerous advantages to users. In particular, the system described herein assists drivers in parking vehicles. Further, the system relies on data from local sensors providing the advantage of accurate data and parking availability when global positioning system signals are not available. Further, the system and apparatus described herein may be deployed by the vehicle user in any desired location.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for parking assistance, the method comprising:
   identifying, using processing circuitry, at least one parking space based on information acquired from a plurality of sensors associated with the at least one parking space;
   wherein identifying the at least one parking space further includes:
      outputting a ping signal;
      receiving acknowledgment signals from one or more sensors of the plurality of sensors; and
      identifying the one or more sensors by comparing signal strength of the received acknowledgment signals to a predetermined threshold;
   connecting to the plurality of sensors associated with the identified at least one parking space;
   acquiring measurement data from the plurality of sensors indicative of a vehicle position;
   determining, using the processing circuitry, whether two or more parking spaces are available;
   when two or more available parking spaces are determined to be available, providing a user of a vehicle corresponding to the vehicle position with an image of the two or more available parking spaces wherein each of the two or more available parking spaces has superimposed boundaries;
receiving a selection from the user indicative of a selected parking space;
determining, using the processing circuitry, a parking trajectory based on the selected parking space and the measurement data; and
controlling at least one subsystem of the vehicle based on the parking trajectory.

2. The method of claim 1, further comprising:
disabling one or more sensors of the plurality of sensors associated with an occupied parking space.

3. The method of claim 1, further comprising:
deactivating one or more sensors of the plurality of sensors associated with non-selected available parking spaces.

4. The method of claim 1, further comprising:
determining which subset of sensors of the plurality of sensors is associated with the selected parking space based on unique identification information associated with each sensor of the plurality of sensors.

5. The method of claim 1, further comprising:
activating the plurality of sensors when the vehicle is detected within a predetermined distance.

6. The method of claim 1, wherein the at least one subsystem is an autonomous parking system.

7. The method of claim 1, further comprising:
outputting parking instructions via a head unit of the vehicle based on the parking trajectory.

8. The method of claim 1, wherein the information includes at least one of parking space occupancy, time limits, and zone restriction.

9. A parking assistance apparatus, the apparatus comprising:
a controller configured to
identify at least one parking space based on information acquired from a plurality of sensors associated with the at least one parking space,
wherein identifying the at least one parking space further includes:
outputting a ping signal;
receiving acknowledgment signals from one or more sensors of the plurality of sensors; and
identifying the one or more sensors by comparing signal strength of the received acknowledgment signals to a predetermined threshold;
connect to the plurality of sensors associated with the identified at least one parking space,
acquire measurement data from the plurality of sensors indicative of a vehicle position,
determine whether two or more parking spaces are available,
provide a user of a vehicle corresponding to the vehicle position with an image of the two or more available parking spaces when two or more available parking spaces are determined to be available, wherein each of the two or more available parking spaces has superimposed boundaries;
receive a selection from the user indicative of a selected parking space;
determine a parking trajectory based on the selected parking space and the measurement data, and
control at least one subsystem of the vehicle based on the parking trajectory.

10. The apparatus of claim 9, wherein the controller is further configured to:
disable one or more sensors of the plurality of sensors associated with an occupied parking space.

11. The apparatus of claim 9, wherein the controller is further configured to:
deactivate one or more sensors of the plurality of sensors associated with non-selected available parking spaces.

12. The apparatus of claim 9, wherein the controller is further configured to:
determine which subset of sensors of the plurality of sensors is associated with the selected parking space based on unique identification information associated with each sensor of the plurality of sensors.

13. The apparatus of claim 9, wherein the at least one subsystem is an autonomous parking system.

14. The apparatus of claim 9, wherein the controller is further configured to:
output parking instructions via a head unit of the vehicle based on the parking trajectory.

15. A non-transitory computer readable medium storing computer-readable instructions therein which when executed by a computer cause the computer to perform a method for parking assistance, the method comprising:
identifying at least one parking space based on information acquired from a plurality of sensors associated with the at least one parking space;
wherein identifying the at least one parking space further includes:
outputting a ping signal;
receiving acknowledgment signals from one or more sensors of the plurality of sensors; and
identifying the one or more sensors by comparing signal strength of the received acknowledgment signals to a predetermined threshold,
connecting to the plurality of sensors associated with the identified at least one parking space;
acquiring measurement data from the plurality of sensors indicative of a vehicle position;
determining whether two or more parking spaces are available;
when two or more available parking spaces are determined to be available, providing a user of a vehicle corresponding to the vehicle position with an image of the two or more available parking spaces wherein each of the two or more available parking spaces has superimposed boundaries;
receiving a selection from the user indicative of a selected parking space;
determining a parking trajectory based on the selected parking space and the measurement data; and
controlling at least one subsystem of the vehicle based on the parking trajectory.

\* \* \* \* \*